United States Patent
Morioka

(10) Patent No.: US 9,084,285 B2
(45) Date of Patent: Jul. 14, 2015

(54) RADIO COMMUNICATION DEVICE, METHOD AND SYSTEM USING MULTIPLE COMMUNICATION PROTOCOLS

(75) Inventor: Yuichi Morioka, Tokyo (JP)

(73) Assignee: SONY CORPORATION, Tokyo (JP)

( * ) Notice: Subject to any disclaimer, the term of this patent is extended or adjusted under 35 U.S.C. 154(b) by 55 days.

(21) Appl. No.: 13/578,954

(22) PCT Filed: Jan. 20, 2011

(86) PCT No.: PCT/JP2011/050959
§ 371 (c)(1),
(2), (4) Date: Aug. 14, 2012

(87) PCT Pub. No.: WO2011/108302
PCT Pub. Date: Sep. 9, 2011

(65) Prior Publication Data
US 2012/0307737 A1    Dec. 6, 2012

(30) Foreign Application Priority Data

Mar. 3, 2010    (JP) ................................ 2010-046436

(51) Int. Cl.
*H04W 4/00*        (2009.01)
*H04W 88/06*       (2009.01)
*H04W 16/14*       (2009.01)
*H04W 74/08*       (2009.01)

(52) U.S. Cl.
CPC .............. *H04W 88/06* (2013.01); *H04W 16/14* (2013.01); *H04W 74/0816* (2013.01)

(58) Field of Classification Search
CPC .. H04W 16/14; H04W 74/0816; H04W 88/06
See application file for complete search history.

(56) References Cited

U.S. PATENT DOCUMENTS 7,447,185 B2 *  11/2008  Trainin .......................... 370/338
7,650,559 B2 *  1/2010  Nishibayashi et al. ....... 714/776
(Continued)

FOREIGN PATENT DOCUMENTS

CN    101223731 A    7/2008
CN    101627657 A    1/2010
(Continued)

OTHER PUBLICATIONS

Leonardo Lanante, "IEEE802.11ac Preamble with Legacy 802.11 a/n Backward Compatibility", IEEE 802.11-09/0847r1, Nov. 2009, Slides 1-27.*

(Continued)

*Primary Examiner* — Andrew Lai
*Assistant Examiner* — Mahmudul Hasan
(74) *Attorney, Agent, or Firm* — Oblon, McClelland, Maier & Neustadt, L.L.P.

(57) ABSTRACT

To be provided is a radio communication device including a packet generation unit for generating a packet including first decoding information that can be recognized by a radio communication device corresponding to a first communication scheme, second decoding information that can be recognized by a radio communication device corresponding to a second communication scheme and third decoding information that can be recognized by a radio communication device corresponding to a third communication scheme, and a transmission unit for transmitting the packet generated by the packet generation unit.

14 Claims, 11 Drawing Sheets

(56) References Cited

U.S. PATENT DOCUMENTS

| | | | |
|---|---|---|---|
| 7,733,866 B2* | 6/2010 | Mishra et al. | 370/393 |
| 8,238,316 B2* | 8/2012 | Stacey et al. | 370/338 |
| 2004/0022222 A1* | 2/2004 | Clisham | 370/338 |
| 2005/0210157 A1* | 9/2005 | Sakoda | 709/251 |
| 2005/0220145 A1* | 10/2005 | Nishibayashi et al. | 370/474 |
| 2005/0237992 A1* | 10/2005 | Mishra et al. | 370/349 |
| 2006/0256746 A1* | 11/2006 | Quick et al. | 370/315 |
| 2006/0270364 A1* | 11/2006 | Aoki | 455/101 |
| 2006/0280134 A1* | 12/2006 | Kwon et al. | 370/278 |
| 2007/0204052 A1* | 8/2007 | Trainin et al. | 709/230 |
| 2007/0253499 A1* | 11/2007 | Waters et al. | 375/260 |
| 2010/0046656 A1* | 2/2010 | van Nee et al. | 375/267 |
| 2010/0074198 A1 | 3/2010 | Morioka | |
| 2010/0091673 A1* | 4/2010 | Sawai et al. | 370/252 |
| 2010/0284393 A1* | 11/2010 | Abraham et al. | 370/343 |
| 2010/0315952 A1* | 12/2010 | Pare et al. | 370/241 |
| 2011/0149927 A1* | 6/2011 | Stacey et al. | 370/338 |
| 2011/0150004 A1* | 6/2011 | Denteneer et al. | 370/476 |
| 2011/0305233 A1* | 12/2011 | Seok | 370/338 |
| 2011/0317599 A1* | 12/2011 | Takano | 370/310 |

FOREIGN PATENT DOCUMENTS

| | | |
|---|---|---|
| JP | 2006-50526 | 2/2006 |
| JP | 2008-252867 | 10/2008 |
| WO | WO 2008/111496 A2 | 9/2008 |

OTHER PUBLICATIONS

IEEE802~11acPreamble with Legacy 802~11a/n—Backward Compatibility Nov. 2009 . doc.: IEEE 802.11-09/0S47r1.*

IEEE 802.11-09/0847r1 IEEE802.11ac Preamble with Legacy 802. 11 a/n Backward Compatibility.*

Combined Chinese Office Action and Search Report issued Jun. 6, 2014 in Patent Application No. 201180010849.1 (with English language translation).

International Search Report and Written Opinion issued Feb. 15, 2011 in corresponding International Application No. PCT/JP2011/050959 filed Jan. 20, 2011 (with an English Translation of Categories).

Leonardo Lanante, "IEEE802.11ac Preamble with Legacy 802.11a/n Backward Compatibility", IEEE 802.11-09/0847r1, Nov. 2009, Slides 1-27.

Office Action issued Jan. 21, 2014 in Japanese Patent Application No. 2010-046436.

Office Action issued Jan. 27, 2015 in Chinese Patent Application No. 201180010849.1 (with English Translation).

* cited by examiner

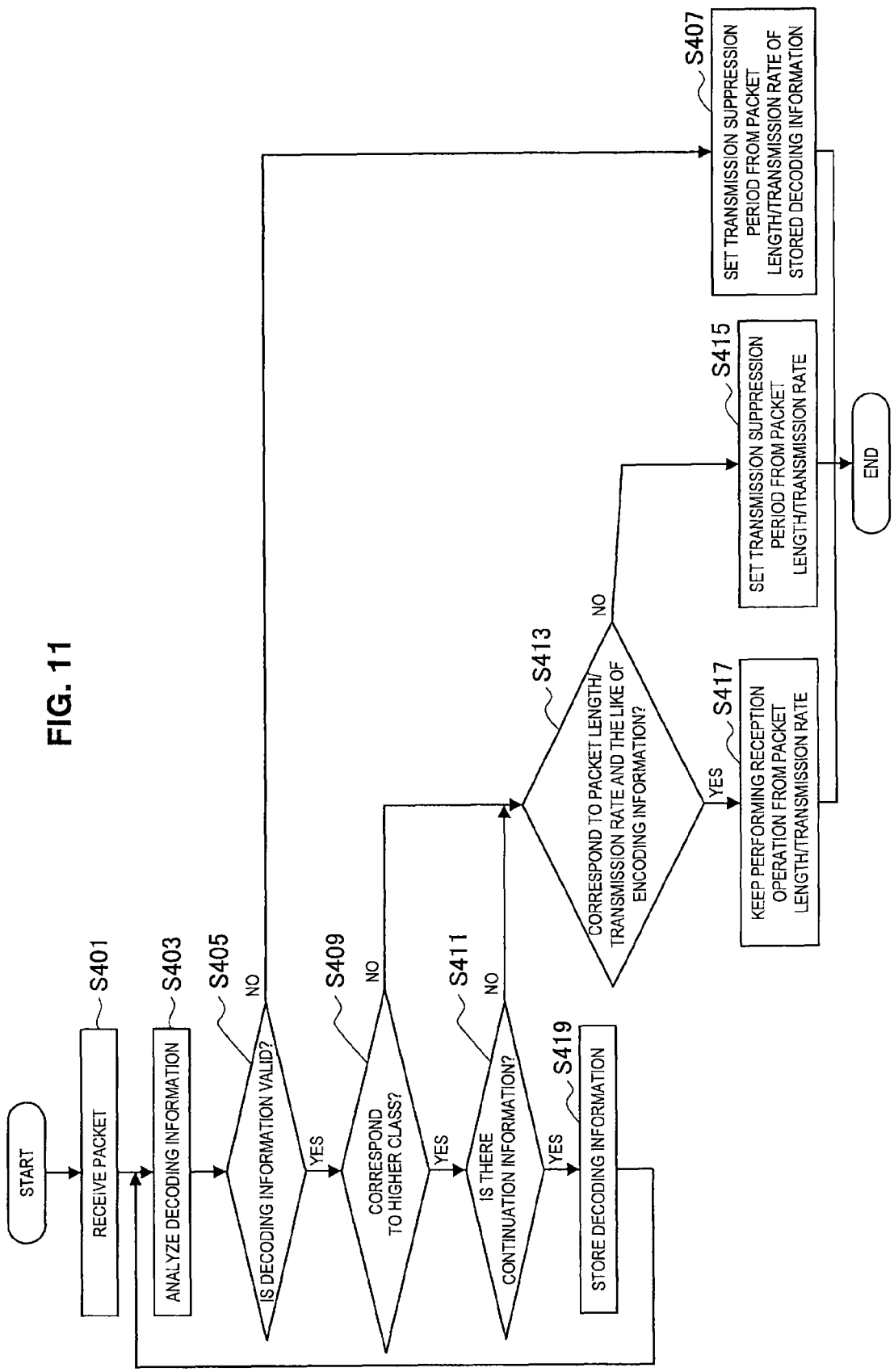

RADIO COMMUNICATION DEVICE, METHOD AND SYSTEM USING MULTIPLE COMMUNICATION PROTOCOLS

TECHNICAL FIELD

The present invention relates to a radio communication device, a radio communication method and a radio communication system.

BACKGROUND ART

For radio communication, wireless local area network (LAN) standards such as IEEE802.11 have been set. As the wireless LAN standards, higher standards that support higher communication rates using the same frequency band tend to be set in sequence. For example, a higher standard than IEEE802.11a, IEEE802.11n, has already been set.

In the case of radio communication including communication conforming to a wireless LAN standard as mentioned above, it is necessary to avoid collisions of communication in the same frequency band. To this end, for example, in IEEE802.11, a Request To Send/Clear To Send (RTS/CTS) mechanism has been introduced. In this mechanism, a radio communication device that will perform data transmission performs communication for ensuring communication time with another nearby radio communication device before data transmission.

When a higher standard and a lower standard such as IEEE802.11a and IEEE802.11n are permitted to coexist in the same frequency band, for example, communication for the RTS/CTS needs to be performed according to the lower standard so that a radio communication device corresponding only to the lower standard can also receive the RTS/CTS. As a result, even during transmission and reception according to the higher standard, low-speed communication is performed according to the lower standard and overhead of the higher standard increases, and thus full performance may not be exhibited.

In Patent Literature 1 below, an example of technology for avoiding a communication collision without using a sequence such as the RTS/CTS in an environment in which two communication schemes of higher and lower standards coexist is disclosed.

For example, in wireless LAN standards, a standard that is referred to as IEEE802.11ac and supports a further higher communication rate has recently been set above IEEE802.11a and IEEE802.11n. In this way, coexistence of three communication schemes constituting classes in radio communication is being realized.

CITATION LIST

Patent Literature

Patent Literature 1: JP 2006-50526A

SUMMARY OF INVENTION

Technical Problem

However, when three communication schemes constituting classes in radio communication coexist, a method such as the Request To Send/Clear To Send (RTS/CTS) further increases overhead of an upper standard, and it is impossible to exhibit full performance.

The present invention has been achieved in consideration of these problems, and is intended to provide an improved new radio communication device, radio communication method and radio communication system capable of enabling coexistence of the three communication schemes constituting the classes while suppressing overhead.

Solution to Problem

According to an aspect of the present invention in order to achieve the above-mentioned object, there is provided a radio communication device including: a packet generation unit for generating a packet including first decoding information that can be recognized by a radio communication device corresponding to a first communication scheme, second decoding information that can be recognized by a radio communication device corresponding to a second communication scheme and third decoding information that can be recognized by a radio communication device corresponding to a third communication scheme; and a transmission unit for transmitting the packet generated by the packet generation unit.

This configuration allows decoding information that can be recognized by respective communication schemes to be included in one packet, and it is possible to enable the three communication schemes constituting classes to coexist while suppressing overhead.

The radio communication device corresponding to the first communication scheme may correspond only to the first communication scheme, the radio communication device corresponding to the second communication scheme may also correspond to the first communication scheme, and the radio communication device corresponding to the third communication scheme may also correspond to the first communication scheme and the second communication scheme.

The packet may include the second decoding information following the first decoding information, and the third decoding information following the second decoding information.

The first decoding information may include information for calculating a first duration in which the radio communication device corresponding only to the first communication scheme is caused to keep performing a receiving operation, and the second decoding information may include information for calculating a second duration in which the radio communication device that corresponds to the second communication scheme but does not correspond to the third communication scheme is caused to keep performing a receiving operation.

The first duration and the second duration may end at different times.

The first decoding information may include first continuation information indicating presence of the second decoding information to the radio communication device corresponding to the second communication scheme and the radio communication device corresponding to the third communication scheme, and the second decoding information may include second continuation information indicating presence of the third decoding information to the radio communication device corresponding to the third communication scheme.

When the radio communication device corresponding only to the first communication scheme is not within a range in which the packet is transmitted, the packet generation unit may generate the packet without the first decoding information.

When the radio communication device that corresponds to the second communication scheme but does not correspond to the third communication scheme is not within a range in which the packet is transmitted, the packet generation unit may generate the packet without the second decoding information.

According to another aspect of the present invention in order to achieve the above-mentioned object, there is provided a radio communication device including: a reception unit for receiving a packet including first decoding information that can be recognized by a radio communication device corresponding to a first communication scheme, second decoding information that can be recognized by a radio communication device corresponding to a second communication scheme and third decoding information that can be recognized by a radio communication device corresponding to a third communication scheme; and a packet analysis unit for analyzing the packet received by the reception unit.

The packet may include the second decoding information following the first decoding information, and the third decoding information following the second decoding information.

The first decoding information may include first continuation information indicating presence of the second decoding information to the radio communication device corresponding to the second communication scheme and the radio communication device corresponding to the third communication scheme, and the second decoding information may include second continuation information indicating presence of the third decoding information to the radio communication device corresponding to the third communication scheme.

The reception unit may keep performing a receiving operation on the basis of information included in the third decoding information according to the first communication scheme, the second communication scheme and the third communication scheme.

According to still another aspect of the present invention in order to achieve the above-mentioned object, there is provided a radio communication method including the steps of: generating a packet including first decoding information that can be recognized by a radio communication device corresponding to a first communication scheme, second decoding information that can be recognized by a radio communication device corresponding to a second communication scheme and third decoding information that can be recognized by a radio communication device corresponding to a third communication scheme; and transmitting the packet generated in the generating step.

According to yet another aspect of the present invention in order to achieve the above-mentioned object, there is provided a radio communication method including the steps of: receiving a packet including first decoding information that can be recognized by a radio communication device corresponding to a first communication scheme, second decoding information that can be recognized by a radio communication device corresponding to a second communication scheme and third decoding information that can be recognized by a radio communication device corresponding to a third communication scheme; and analyzing the packet received in the receiving step.

According to yet another aspect of the present invention in order to achieve the above-mentioned object, there is provided a radio communication system including: a first radio communication device having a packet generation unit for generating a packet including first decoding information that can be recognized by a radio communication device corresponding to a first communication scheme, second decoding information that can be recognized by a radio communication device corresponding to a second communication scheme and third decoding information that can be recognized by a radio communication device corresponding to a third communication scheme, and a transmission unit for transmitting the packet generated by the packet generation unit; and a second radio communication device having a reception unit for receiving the packet, and a packet analysis unit for analyzing the packet received by the reception unit.

Advantageous Effects of Invention

According to the above-described present invention, it is possible to permit three communication schemes constituting classes to coexist while suppressing overhead.

BRIEF DESCRIPTION OF DRAWINGS

FIG. 11 is a flowchart illustrating operation during data reception of the radio communication device relating to the same embodiment.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

In this specification and the drawings, a plurality of elements having substantially the same functional configuration may be distinguished according to different alphabetic characters added after the same sign. For example, a plurality of elements having substantially same the functional configuration may be distinguished as radio communication devices 100A and 100B according to necessity. However, when there is no particular need to distinguish a plurality of elements having substantially the same functional configuration, only the common symbol is given. For example, when there is no particular need to distinguish the radio communication devices 100A and 100B, they are simply referred to as radio communication devices 100.

A description will be given in the following order.
1. Radio Communication System According to Embodiment of Present Invention
2. Radio Communication Device According to Embodiment of Present Invention
3. Embodiments of Present Invention
   3-1. First Embodiment
      3-1-1. Configuration of Packet
      3-1-2. Operation of Radio Communication Device Performing Transmission and Reception
      3-1-3. Operation of Other Radio Communication Devices
      3-1-4. Effect of Present Embodiment
      3-1-5. Modified Example
   3-2. Second Embodiment
      3-2-1. Configuration of Packet
      3-2-2. Example of Operation of Radio Communication Device
      3-2-3. Effect of Present Embodiment
   3-3. Third Embodiment
      3-3-1. Configuration of Packet
      3-3-2. Case to Which Present Embodiment Can Be Applied
      3-3-3. Effect of Present Embodiment
   3-4. Fourth Embodiment
      3-4-1. Operation of Radio Communication Device During Data Transmission
      3-4-2. Operation of Radio Communication Device During Data Reception
4. Additions <1. Radio Communication System According to Embodiment of Present Invention>

Figure 1:
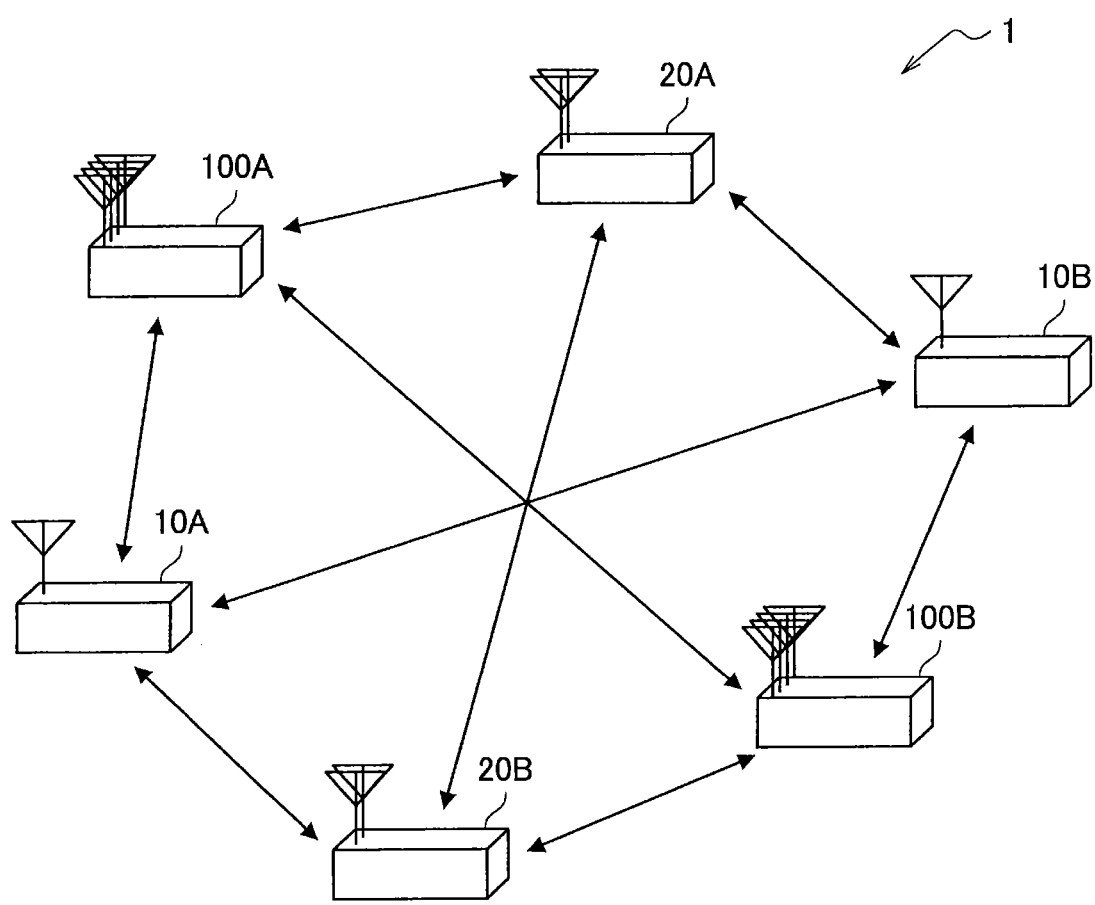
FIG. 1 is a diagram showing an example of a radio communication system according to an embodiment of the present invention.

FIG. 1 is a diagram showing an example of a radio communication system according to an embodiment of the present invention. A radio communication system 1 includes radio communication devices 10A, 10B, 20A, 20B, 100A and 100B. The radio communication devices are each, for example, a personal computer (PC), a home image processing device (DVD recorder, video deck, or the like), a personal digital assistant (PDA), a home game machine, an electric appliance, a portable image processing device, a portable game machine, and the like. In the radio communication system 1, communication is performed by such radio communication devices.

In the radio communication system 1, three communication schemes including a first communication scheme, a second communication scheme and a third communication scheme coexist in the same frequency band. The radio communication devices 10A and 10B correspond to the first communication scheme, the radio communication devices 20A and 20B correspond to the second communication scheme, and the radio communication devices 100A and 100B correspond to the third communication scheme.

Here, the first communication scheme, the second communication scheme and the third communication scheme are three communication schemes constituting classes. In other words, the second communication scheme is a higher standard than the first communication scheme, and the third communication scheme is a higher standard than the second communication scheme.

In the radio communication system 1, the radio communication devices corresponding to the respective communication schemes have compatibility with communication schemes corresponding to lower standards. In other words, the radio communication devices 10A and 10B corresponding to the first communication scheme correspond only to the first communication scheme, the radio communication devices 20A and 20B corresponding to the second communication scheme also correspond to the first communication scheme, and the radio communication devices 100A and 100B corresponding to the third communication scheme also correspond to the first communication scheme and the second communication scheme.

Figure 2:
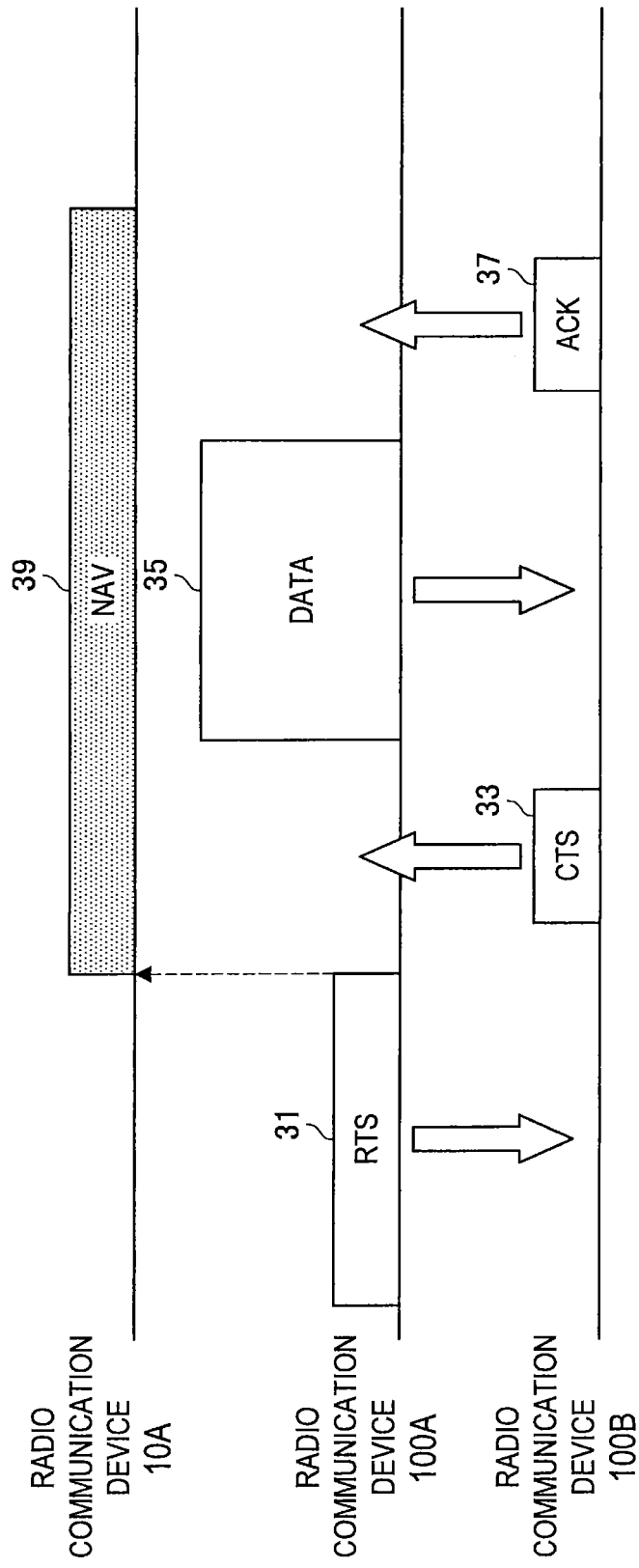
FIG. 2 is a diagram illustrating an example of communication when a Request To Send/Clear To Send (RTS/CTS) mechanism is used in the radio communication system of FIG. 1.

FIG. 2 is a diagram illustrating an example of communication when a Request To Send/Clear To Send (RTS/CTS) mechanism is used to transmit data from the radio communication device 100A to the radio communication device 100B in the radio communication system 1 as described above. In addition to the radio communication device 100A that is a transmission source and the radio communication device 100B that is a transmission destination, the radio communication device 10A is shown as a radio communication device in the radio communication system 1.

The radio communication device 100A first transmits an RTS 31 that requests transmission of data. The RTS 31 is received by the radio communication device 100B that is a transmission destination and the other radio communication device 10A.

The radio communication device 100B transmits a CTS 33 indicating that preparation for data reception has been completed as a response to the RTS 31. The radio communication device 100A having received the CTS 33 transmits data 35. The radio communication device 100B that has finished receiving the data 35 transmits an ACK 37 indicating that reception has been completed normally.

Meanwhile, when the RTS 31 is received, the radio communication device 10A sets a network allocation vector (NAV) 39. The NAV 39 is a transmission suppression period for preventing a communication collision occurring when another radio communication device transmits data while the radio communication device 100A and the radio communication device 100B are performing data transmission and reception.

The radio communication device 10A having set the NAV 39 is controlled not to start data transmission for a predetermined time designated by the RTS 31, for example, a time until the ACK 37 is transmitted after the RTS 31 is received.

As mentioned above, the radio communication device 10A corresponds to the first communication scheme. Accordingly, the radio communication device 100A needs to transmit the RTS 31 using the first communication scheme that the radio communication device 10A can recognize. This is because, when the radio communication device 10A is not able to recognize the RTS 31, the radio communication device 10A is not able to set the NAV 39 and may cause a communication collision by, for example, starting transmission of other data during transmission of the data 35.

Transmission and reception of the data 35 between the radio communication device 100A and the radio communication device 100B corresponding to the third communication scheme can be performed using a high-speed transmission rate used in the third communication scheme. However, transmission and reception of the RTS 31 and the like should be performed using a low-speed transmission rate used in the first communication scheme. Accordingly, overhead due to transmission and reception of the RTS 31 becomes relatively large, and performance of the third communication scheme is not able to be fully exhibited.

In the radio communication system 1 according to the embodiment of the present invention, the three communication schemes constituting the classes coexist as described above.

<2. Radio Communication Device According to Embodiment of Present Invention>

Figure 3:
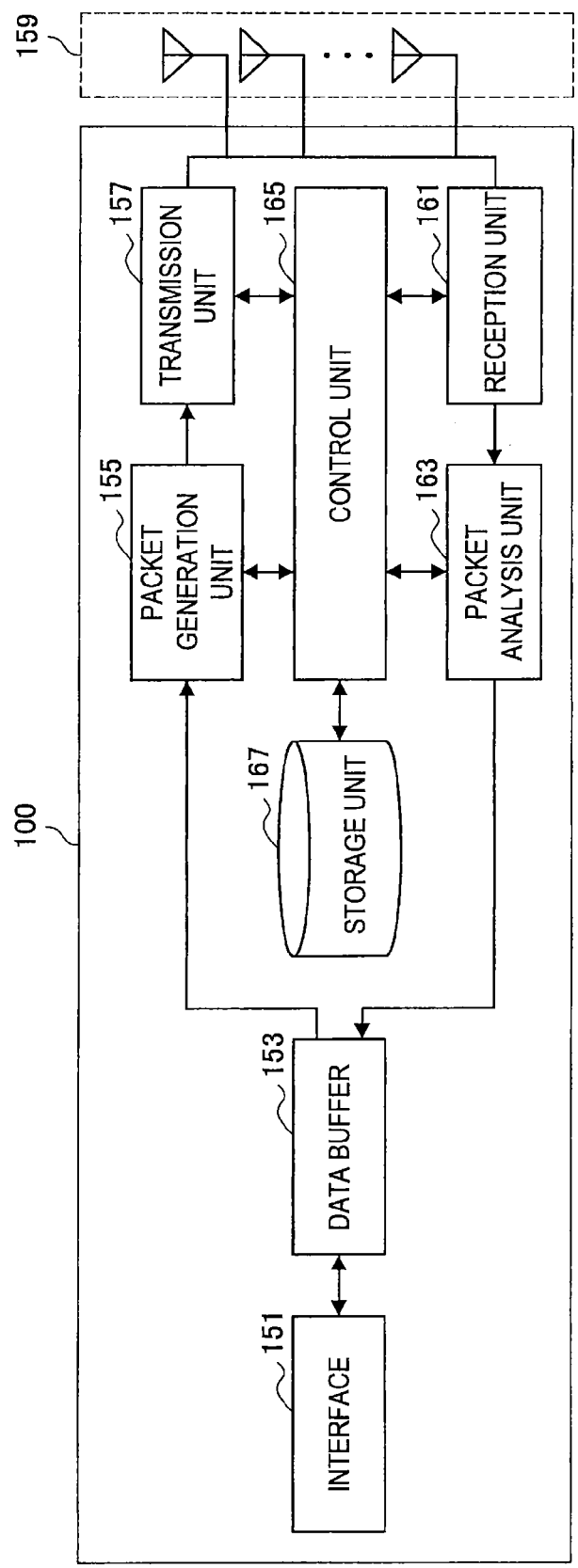
FIG. 3 is a diagram showing a configuration of a radio communication device according to an embodiment of the present invention.

FIG. 3 is a diagram showing a configuration of a radio communication device 100 according to an embodiment of the present invention. The radio communication device 100 has an interface 151, a data buffer 153, a packet generation unit 155, a transmission unit 157, an antenna 159, a reception unit 161, a packet analysis unit 163, a control unit 165 and a storage unit 167.

The interface 151 performs input and output of data transmitted and received between an external communication device and the radio communication device 100 via, for example, a network. The data buffer 153 temporarily stores transmission data input to the interface 151 or reception data to be output from the interface 151.

The packet generation unit 155 generates a packet transmitted by the radio communication device 100. For example, when data is transmitted, the packet generation unit 155 generates a packet by adding a control header to data stored in the data buffer 153. In the control header, decoding information for decoding the data is included.

The transmission unit 157 transmits the packet generated by the packet generation unit 155 to another radio communication device of the radio communication system 1 through the antenna 159. When the communication scheme corresponding to the radio communication devices 100 supports multi-input multi-output (MIMO), the antenna 159 may consist of a plurality of antennas.

The reception unit 161 receives a packet from another radio communication device of the radio communication system 1 through the antenna 159. The packet analysis unit 163 analyzes the packet received by the reception unit 161. For example, when data is received, the packet analysis unit 163 decodes the data on the basis of decoding information obtained by analyzing a control header included in the packet, and stores the decoded data in the data buffer 153.

The control unit 165 controls operation of the packet generation unit 155, the transmission unit 157, the reception unit 161 and the packet analysis unit 163. The storage unit 167 stores information necessary for the control unit 165 to perform a process.

Each function of the radio communication devices 100 may be implemented as dedicated hardware or implemented as software using a computer. In this case, the computer properly has a central processing unit (CPU), storage devices such as a hard disk drive (HDD), a read only memory (ROM) and a random access memory (RAM), a communication device connected to networks such as LAN and the Internet, input devices such as a mouse and a keyboard, and a drive for reading from and writing to a removable storage medium such as a magnetic disk, an optical disc or a semiconductor memory. Each function of the radio communication devices 100 may be implemented when the CPU executes a program stored in the storage devices or the removable storage medium or a program obtained via a network.

<3. Embodiment of Present Invention>

[3-1. First Embodiment]

(3-1-1. Configuration of Packet)

Figure 4:
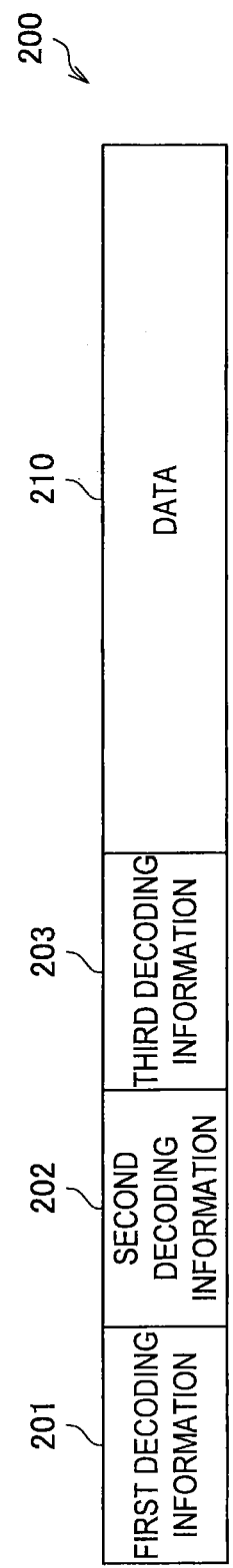
FIG. 4 is a diagram showing an example of a frame configuration of a packet relating to a first embodiment of the present invention.

FIG. 4 is a diagram showing an example of a frame configuration of a packet 200 relating to a first embodiment of the present invention. The packet 200 includes first decoding information 201, second decoding information 202, third decoding information 203, and data 210.

The first decoding information 201 can be recognized by a radio communication device corresponding to the first communication scheme, and includes information of a packet length or a transmission rate necessary to receive data. The second decoding information 202 is included following the first decoding information 201, can be recognized by a radio communication device corresponding to the second communication scheme, and includes information of a packet length or a transmission rate necessary to receive data.

The third decoding information 203 is included following the second decoding information 202, can be recognized by a radio communication device corresponding to the third communication scheme, and includes information of a packet length or a transmission rate necessary to receive data. The data 210 can be recognized by a radio communication device corresponding to the third communication scheme, and is transmitted using the packet length and the transmission rate included in the third decoding information 203.

(3-1-2. Operation of Radio Communication Device Performing Transmission and Reception)

When the radio communication device 100 performs data transmission, first, the packet generation unit 155 adds the first decoding information 201, the second decoding information 202 and the third decoding information 203 each as a control header to the data 210 stored in the data buffer 153, thereby generating the packet 200.

Next, the transmission unit 157 transmits the packet 200 through the antenna 159.

Meanwhile, when the radio communication device 100 performs data reception, first, the reception unit 161 receives the packet 200 through the antenna 159.

Next, the packet analysis unit 163 analyzes a control header included in the packet 200. In the control header, the first decoding information 201, the second decoding information 202 and the third decoding information 203 is included. The packet analysis unit 163 decodes the data 210 on the basis of information obtained by analyzing any piece of the decoding information, and stores the decoded data in the data buffer 153.

(3-1-3. Operation of Other Radio Communication Devices)

Figure 5:
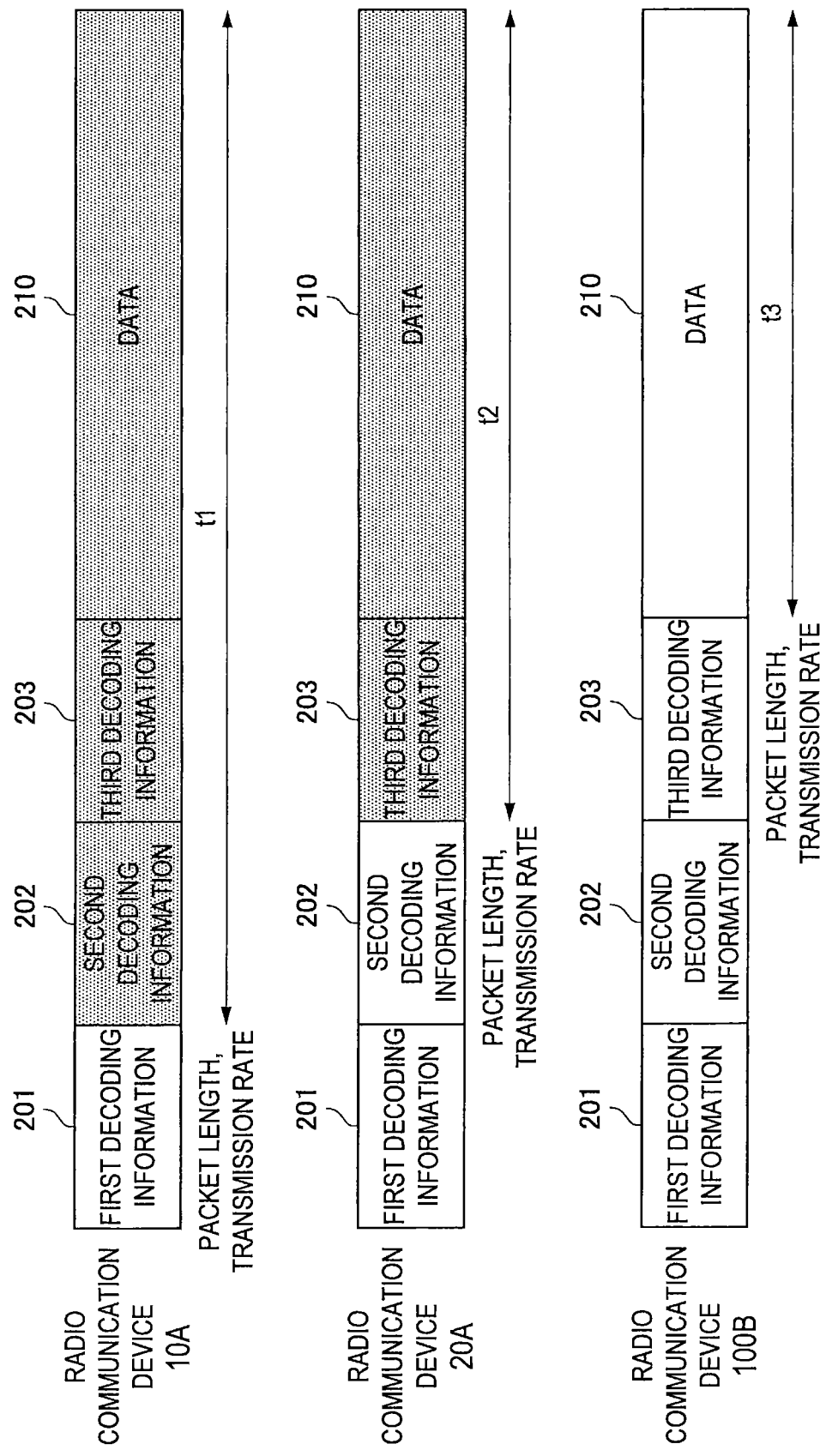
FIG. 5 is a diagram illustrating operation of each radio communication device receiving a packet in a radio communication system relating to the same embodiment.

FIG. 5 is a diagram illustrating operation of each radio communication device receiving the packet 200 transmitted by the radio communication device 100A in the radio communication system 1 relating to the first embodiment of the present invention. As described above, the radio communication device 10A corresponds only to the first communication scheme, the radio communication device 20A corresponds to the first communication scheme and the second communication scheme, and the radio communication device 100B corresponds to all of the first communication scheme, the second communication scheme and the third communication scheme.

The radio communication device 10A can only recognize the first decoding information 201 included in the packet 200. The radio communication device 10A is not able to recognize the other portions of the packet 200 in accordance with the second communication scheme or the third communication scheme, but keeps performing a reception operation during a first duration t1 calculated from the packet length and the transmission rate included in the first decoding information 201.

The radio communication device 20A can recognize the first decoding information 201 and the second decoding information 202 included in the packet 200. The radio communication device 20A is not able to recognize the other portion of the packet 200 in accordance with the third communication scheme, but keeps performing a reception operation during a second duration t2 calculated from the packet length and the transmission rate included in the second decoding information 202.

The radio communication device 100B can recognize all the information included in the packet 200. The radio communication device 100B keeps performing a reception operation during a third duration t3 calculated from the packet length and the transmission rate included in the third decoding information 203, and receives and decodes the data 210 on the basis of the information included in the third decoding information 203.

Since a radio communication device does not start transmission while performing a reception operation, the radio communication device 10A is controlled not to start transmission during the first duration t1, and the radio communication device 20A is controlled not to start transmission during the second duration t2. In other words, it is possible to obtain the same effect as in a case in which a NAV is set according to a sequence of the RTS/CTS.

(3-1-4. Effect of Present Embodiment)

In the above-described first embodiment of the present invention, when the three communication schemes constituting the classes coexist, a radio communication device that corresponds only to a lower communication scheme can be controlled not to start data transmission during a predetermined time without using a sequence such as the aforementioned RTS/CTS, and it is possible to suppress overhead when communication is performed using an upper communication scheme.

(3-1-5. Modified Example)

Figure 6:
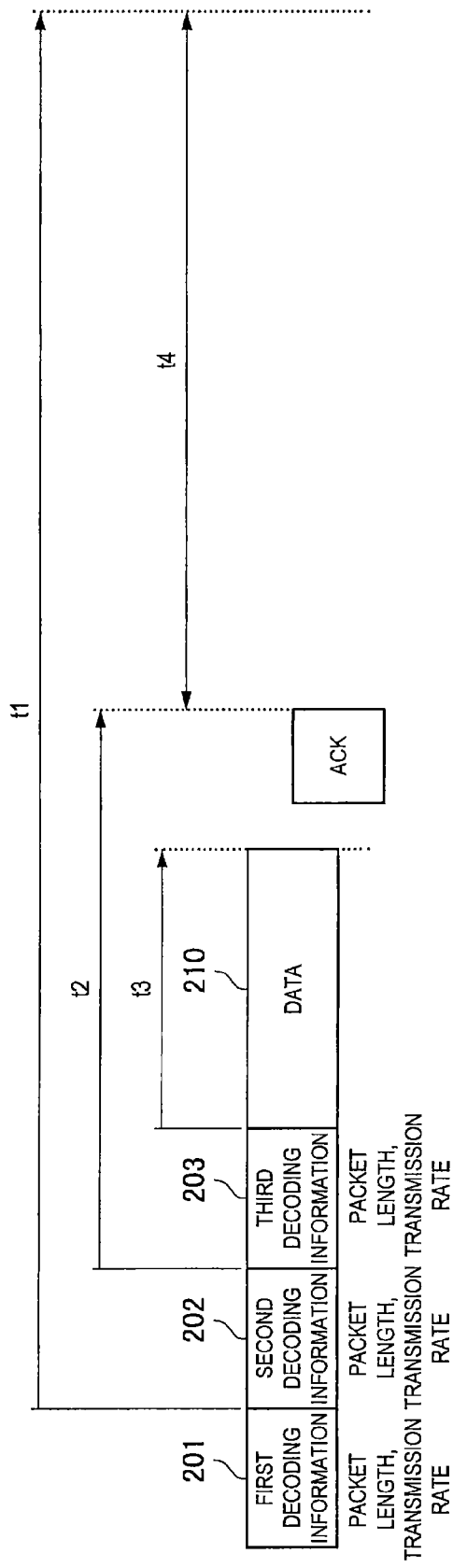
FIG. 6 is a diagram illustrating an example of a relationship between durations relating to a modified example of the same embodiment.

FIG. 6 is a diagram illustrating an example of a relationship between durations calculated from packet lengths and transmission rates included in respective pieces of decoding information. In this example, a second duration t2 is a time from when transmission of data 210 is finished until an acknowledgement (ACK) of the data 210 is sent. Meanwhile, a first duration t1 extends beyond the time when the ACK is sent.

In this way, by setting a time when the first duration t1 ends and a time when the second duration t2 ends to different times, it is possible to perform communication during a time t4 from when the ACK is sent until the first duration t1 ends on the assumption that there is no radio communication device capable of decoding only first decoding information, that is, no radio communication device corresponding only to the first communication scheme.

Using the above-described configuration, for example, a time in which only a radio communication device corresponding to a higher communication scheme can communicate is ensured to perform communication without regard for the presence of a radio communication device corresponding only to a lower communication scheme during this time, and thus overhead can be further suppressed when communication is performed using the higher communication scheme.

[3-2. Second Embodiment]

(3-2-1. Configuration of Packet)

Figure 7:
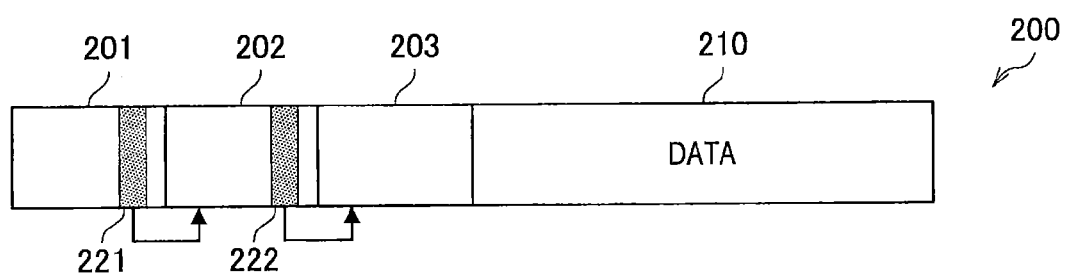
FIG. 7 is a diagram showing an example of a frame configuration of a packet relating to a second embodiment of the present invention.

FIG. 7 is a diagram showing an example of a frame configuration of a packet 200 relating to a second embodiment of the present invention. In the present embodiment, first decoding information 201 includes first continuation information 221. Also, second decoding information 202 includes second continuation information 222.

The first continuation information 221 is information indicating that the second decoding information 202 is following the first decoding information 201 to a radio communication device corresponding to the second communication scheme and a radio communication device corresponding to the third communication scheme.

For example, a specific combination of values of a packet length and a transmission rate included in the first decoding information 201 can be the first continuation information 221. In this case, when the values of the packet length and the transmission rate included in the first decoding information 201 are the specific combination, the radio communication device corresponding to the second communication scheme and the radio communication device corresponding to the third communication scheme determine that the second decoding information 202 is following the first decoding information 201.

The second continuation information 222 is information indicating that third decoding information 203 is following the second decoding information 202 to the radio communication device corresponding to the third communication scheme.

For example, a specific combination of values of a packet length and a modulation scheme included in the second decoding information can be the second continuation information 222. In this case, when the values of the packet length and the modulation scheme included in the second decoding information 202 are the specific combination, the radio communication device corresponding to the third communication scheme determines that the third decoding information 203 is following the second decoding information 202.

(3-2-2. Example of Operation of Radio Communication Device)

Figure 8:
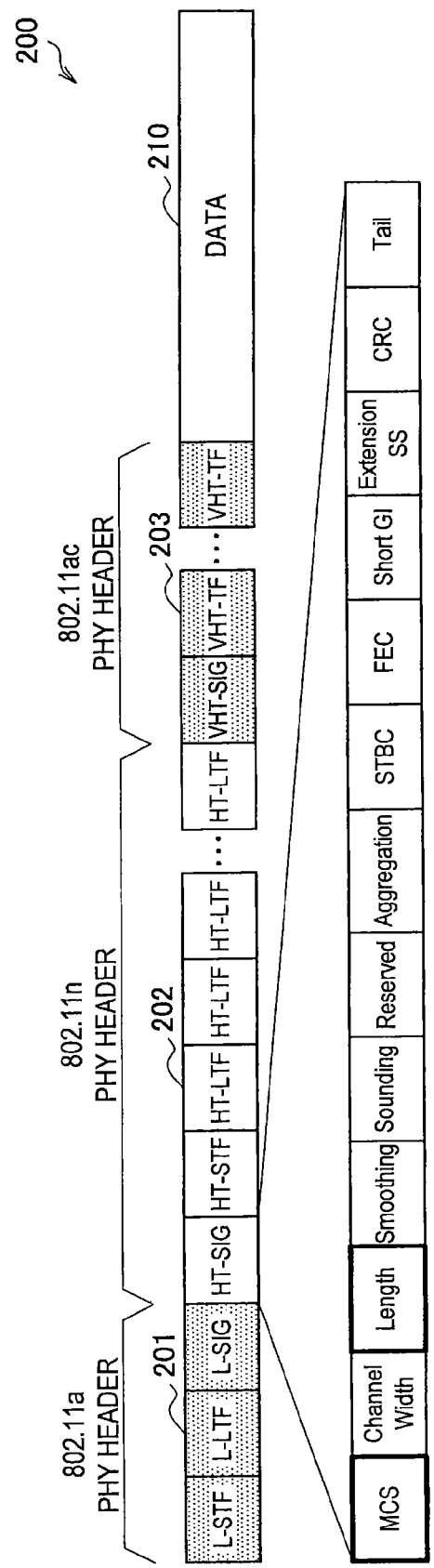
FIG. 8 is a diagram showing in detail a frame configuration of a packet relating to the same embodiment.

FIG. 8 is a diagram showing a packet configuration when the three communication schemes respectively in accordance with IEEE802.11a, IEEE802.11n and IEEE802.11ac of wireless LAN standards coexist, as a detailed example of a frame configuration of the packet 200 relating to the second embodiment of the present invention. An 802.11a physical (PHY) header corresponds to the first decoding information 201, an 802.11n PHY header corresponds to the second decoding information 202, and an 802.11ac PHY header corresponds to the third decoding information 203.

Operation of a case in which the radio communication device 100 relating to the second embodiment of the present invention performs data transmission will be described using the example. First, the control unit 165 causes the packet generation unit 155 to generate an 802.11a PHY header so that values of a transmission rate and a packet length (not shown) included in a legacy signal (L-SIG) portion can be a predetermined specific combination.

Next, the control unit 165 causes the packet generation unit 155 to generate an 802.11n PHY header so that values of a modulation and coding scheme (MCS) and a length (packet length) included in a high throughput signal (HT-SIG) portion can be a predetermined specific combination.

Furthermore, the control unit 165 causes the packet generation unit 155 to generate an 802.11ac PHY header with a value necessary for receiving actual data 210. The packet generation unit 155 generates the packet 200 by adding the respective generated PHY headers to the data 210 as shown in FIG. 8, and the transmission unit 157 transmits the packet 200 through the antenna 159.

Next, operation of a case in which the radio communication device 100 relating to the second embodiment of the present invention performs data reception will be described using the example. First, the control unit 165 determines whether values of a transmission rate and a packet length included in an L-SIG portion of an 802.11a PHY header analyzed by the packet analysis unit 163 are a predetermined specific combination. When the values of the transmission rate and the packet length are the predetermined specific combination, the control unit 165 causes the packet analysis unit 163 to analyze an 802.11n PHY header in succession.

Next, the control unit 165 determines whether values of an MCS and a length included in an HT-SIG portion of the 802.11n PHY header analyzed by the packet analysis unit 163 are a predetermined specific combination. When the values of the MCS and the length are the predetermined specific combination, the control unit 165 causes the packet analysis unit 163 to analyze an 802.11ac PHY header in succession.

Also, the control unit 165 causes the reception unit 161 to keep performing a reception operation according to the content of the 802.11ac PHY header analyzed by the packet analysis unit 163, and causes the packet analysis unit 163 to decode the data 210. The packet analysis unit decodes the data according to the content of the 802.11ac PHY header and stores the decoded data in the data buffer 153.

(3-2-3. Effect of Present Embodiment)

In the above-described second embodiment of the present invention, when the three communication schemes constituting the classes coexist, a radio communication device that corresponds to a plurality of communication schemes can readily determine whether or not there is decoding information of a communication scheme of a higher class.

[3-3. Third Embodiment]

(3-3-1. Configuration of Packet)

Figure 9:
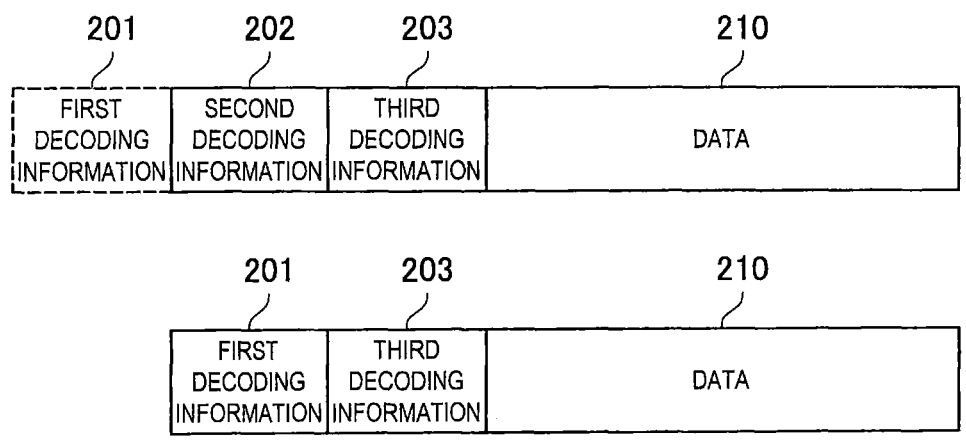
FIG. 9 is a diagram showing an example of a frame configuration of a packet relating to a third embodiment of the present invention.

FIG. 9 is a diagram showing an example of a frame configuration of a packet 200 relating to a third embodiment of the present invention. According to the present embodiment, first decoding information 201 or second decoding information 202 is omitted from the packet 200.

When it is possible to perform communication on the assumption that no radio communication device corresponding only to the first communication scheme is within a range in which the packet 200 is transmitted by the transmission unit 157, the control unit 165 of the radio communication unit 100 controls the packet generation unit 155 to generate the packet 200 without the first decoding information 201.

Also, when it is possible to perform communication on the assumption that no radio communication device that corresponds to the second communication scheme but does not correspond to the third communication scheme is within the range in which the packet 200 is transmitted by the transmission unit 157, the control unit 165 controls the packet generation unit 155 to generate the packet 200 without the second decoding information 202.

(3-3-2. Case to Which Present Embodiment Can Be Applied)

When the modified example of the first embodiment of the present invention described above is applied, communication can be performed on the assumption that there is no radio communication device corresponding only to a lower communication scheme for a predetermined time. For example, the above-described third embodiment of the present invention can be applied for the predetermined time. Also, when it is given as setting information that no radio communication device corresponding to a specific communication scheme is in the radio communication system 1, the third embodiment of the present invention can be applied.

(3-3-3. Effect of Present Embodiment)

In the above-described third embodiment of the present invention, unnecessary pieces of information among a plurality of pieces of decoding information can be omitted, and it is possible to further suppress overhead according to the situation in which communication schemes coexist.

[3-4. Fourth Embodiment]

(3-4-1. Operation of Radio Communication Device During Data Transmission)

Figure 10:
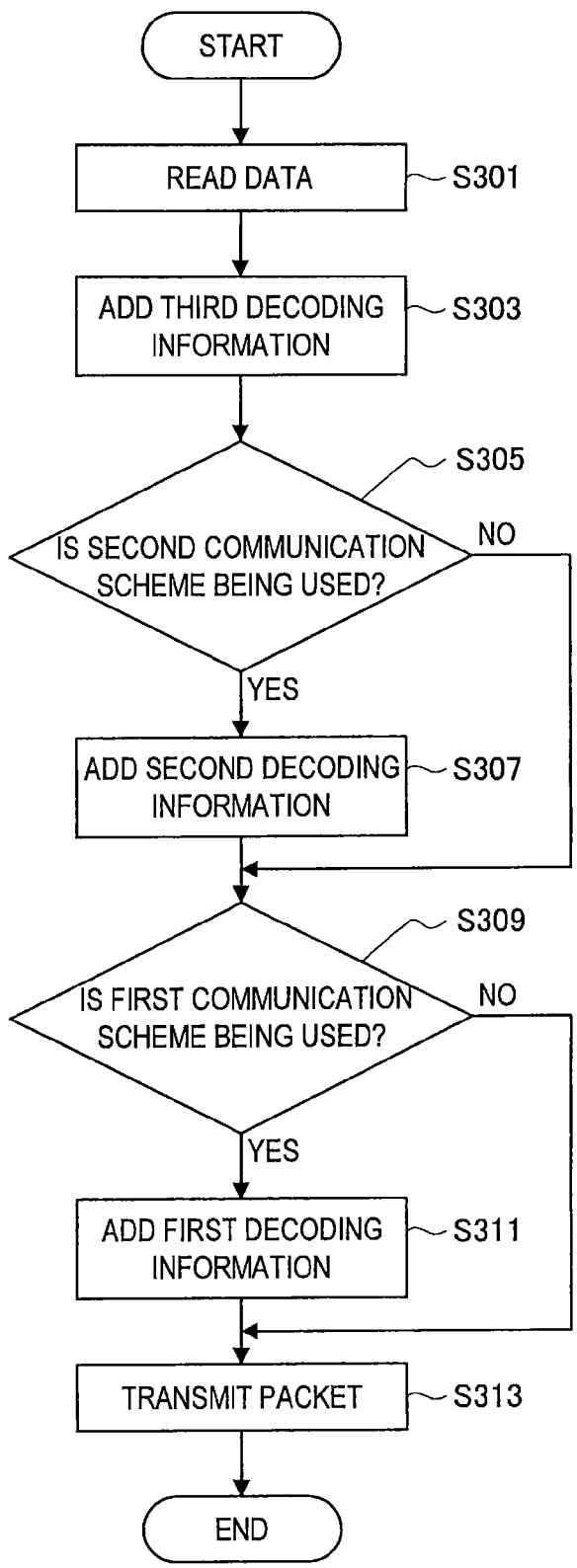
FIG. 10 is a flowchart illustrating operation during data transmission of a radio communication device relating to a fourth embodiment of the present invention.

FIG. 10 is a flowchart illustrating operation of the radio communication device 100 relating to a fourth embodiment of the present invention during data transmission.

First, the packet generation unit 155 reads data 210 stored in the data buffer 153 (step S301). Next, the packet generation unit 155 adds third decoding information 203 including information for decoding the data 210 according to the third communication scheme to the data 210 (step S303).

Here, the control unit 165 determines whether or not the second communication scheme is being used within a range in which a packet 200 is transmitted (step S305). For example, when it is a time in which a radio communication device that corresponds to the second communication scheme but does not correspond to the third communication scheme is performing a reception operation due to a previously transmitted packet 200, the control unit 165 can determine that the second communication scheme is not being used.

When the second communication scheme is being used in the radio communication system 1, the packet generation unit 155 adds second decoding information 202 to the data 210 (step S307). When the second communication scheme is not being used, this step is skipped.

In addition, the control unit 165 determines whether or not the first communication scheme is being used within the range in which the packet 200 is transmitted (step S309). For example, when it is a time in which a radio communication device that corresponds only to the first communication scheme is performing a reception operation due to the previously transmitted packet 200, the control unit 165 can determine that the first communication scheme is not being used.

When the first communication scheme is being used in the radio communication system 1, the packet generation unit 155 adds first decoding information 201 to the data 210 (step S311). When the first communication scheme is not being used, this step is skipped.

Through this process, the packet 200 is generated. The transmission unit 157 transmits the generated packet 200 through the antenna 159 (step S313).

(3-4-2. Operation of Radio Communication Device During Data Reception)

FIG. 11 is a flowchart illustrating operation during data reception of the radio communication device 100 relating to the fourth embodiment of the present invention.

First, the reception unit 161 receives a packet 200 through the antenna 159 (step S401). Next, the packet analysis unit 163 analyzes initial decoding information included in the packet 200 (step S403).

Here, the control unit 165 determines whether or not the analyzed decoding information is valid decoding information (step S405). For example, when the analyzed decoding information is not valid decoding information such as decoding information of a higher class not to be handled by the radio communication device 100, the control unit 165 causes the reception unit 161 to finish a packet receiving operation. When previously analyzed decoding information has been stored in the storage unit 167, the control unit 165 sets only a time calculated from a packet length and a transmission rate included in the decoding information as a transmission suppression period (step S407).

When the decoding information analyzed in step S403 is valid decoding information, the control unit 165 determines whether or not the radio communication device 100 corresponds to a communication scheme of a higher class than a communication scheme of the analyzed decoding information (step S409). When the radio communication device 100 corresponds to a communication scheme of a higher class than the communication scheme of the analyzed decoding information, the control unit 165 additionally determines whether or not continuation information is included in the analyzed decoding information (step S411).

When the radio communication device 100 does not correspond to a communication scheme of a higher class than the communication scheme of the decoding information analyzed in step S403, or no continuation information has been included in the analyzed decoding information, the control unit 165 determines the analyzed decoding information as decoding information for decoding the data 210.

At this time, the control unit 165 additionally determines whether or not the radio communication device 100 corresponds to the packet length, the transmission rate and the like included in the decoding information (step S413). This is because there is a case in which the same communication scheme is not able to correspond to all of transmission rates and the like.

When the radio communication device 100 does not correspond to the packet length, the transmission rate and the like included in the decoding information, the control unit 165 causes the reception unit 161 to finish the packet receiving operation, and sets only a time calculated from the packet length and the transmission rate included in the decoding information as a transmission suppression period (step S415).

When the radio communication device 100 corresponds to the packet length, the transmission rate and the like included in the decoding information, the control unit 165 causes the reception unit 161 to keep performing the reception operation to receive the data 210 for the time calculated from the packet length and the transmission rate included in the decoding information.

When the radio communication device 100 corresponds to a communication scheme of a higher class than the communication scheme of the decoding information analyzed in step S403 (step S409) and continuation information has been included in the analyzed decoding information (step S411), the control unit 165 stores the analyzed decoding information in the storage unit 167 (step S419) and starts analysis of the next decoding information (step S403).

<4. Additions>

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

For example, the embodiments are applied to the case in which three communication schemes constituting classes coexist, but the present invention is not limited to this example. For example, the embodiments may be applied to a case in which four or more communication schemes constituting classes coexist.

In other words, the first communication scheme may not be the lowest class. Also, the second communication scheme may not be a class immediately above the first communication scheme. Furthermore, the third communication scheme may be neither a class immediately above the second communication scheme nor the highest class.

Also in this case, by applying provision of a packet length and a transmission rate for causing a radio communication device corresponding only to a lower communication scheme to keep performing a reception operation, extension of a time for causing a radio communication device corresponding to a specific communication scheme to keep performing a reception operation, omission of decoding information of a communication scheme not present within a range in which a packet is transmitted, and the like in the same way as to the embodiments of the present invention, it is possible to realize coexistence of communication schemes of the respective classes while suppressing overhead.

Reference Signs List

100 Radio communication device
151 Interface
153 Data buffer
155 Packet generation unit
157 Transmission unit
159 Antenna
161 Reception unit
163 Packet analysis unit
165 Control unit
167 Storage unit
200 Packet
201 First decoding information
202 Second decoding information
203 Third decoding information
210 Data
221 First continuation information
222 Second continuation information
t1 First duration
t2 Second duration

The invention claimed is:

1. A radio communication device comprising:
packet generation circuitry that generates a packet including a header portion and a data portion, the header portion including:
  first decoding information corresponding to a first communication scheme when a first radio receiver that recognizes only the first communication scheme is within a transmission range of the radio communication device,
  second decoding information corresponding to a second communication scheme when a second radio receiver that recognizes only the first communication scheme and the second communication scheme is within the transmission range of the radio communication device, and
  third decoding information corresponding to a third communication scheme that is recognizable by a third radio receiver that also recognizes the first communication scheme and the second communication scheme; and
a transmitter that transmits the packet, wherein
the packet generation circuitry, to generate the packet, determines whether the first radio receiver is within the transmission range of the radio communication device and whether the second radio receiver is within the transmission range of the radio communication device.

2. The radio communication device according to claim 1, wherein, within the header portion, the second decoding information follows the first decoding information, and the third decoding information follows the second decoding information.

3. The radio communication device according to claim 2, wherein
the first decoding information includes information used to calculate a first duration in which the first radio receiver performs a receiving operation, and the second decoding information includes information used to calculate a second duration in which the second radio receiver performs a receiving operation.

4. The radio communication device according to claim 3, wherein the first duration and the second duration end at different times.

5. The radio communication device according to claim 2, wherein
the first decoding information includes first continuation information that indicates a presence of the second decoding information to the second radio receiver and the third radio communication device, and
the second decoding information includes second continuation information that indicates a presence of the third decoding information to the third radio receiver.

6. The radio communication device according to claim 1, wherein, when the second radio receiver is not within the transmission range, the packet generation circuitry generates the packet without the second decoding information.

7. A radio communication device comprising:
reception circuitry that receives a packet including a header portion and a data portion, the header portion including:
first decoding information corresponding to a first communication scheme when a first radio apparatus that recognizes only the first communication scheme is within a transmission range of a radio transmission device that transmits the packet,
second decoding information corresponding to a second communication scheme when a second radio apparatus that recognizes only the first communication scheme and the second communication scheme is within the transmission range of the radio transmission device, and
third decoding information corresponding to a third communication scheme that is recognizable by a third radio apparatus that also recognizes the first communication scheme and the second communication scheme; and
packet analysis circuitry that analyzes the packet received by the reception circuitry.

8. The radio communication device according to claim 7, wherein, within the header portion, the second decoding information follows the first decoding information, and the third decoding information follows the second decoding information.

9. The radio communication device according to claim 8, wherein
the reception circuitry recognizes the first communication scheme, the second communication scheme and the third communication scheme, and
the reception circuitry performs a receiving operation based on the third decoding information.

10. The radio communication device according to claim 8, wherein
the first decoding information includes first continuation information that indicates a presence of the second decoding information to devices that recognize the second communication scheme and devices that recognize the third communication scheme, and
the second decoding information includes second continuation information that indicates a presence of the third decoding information to devices that recognize the third communication scheme.

11. A radio communication method by a radio transmission device, the method comprising:
determining, by circuitry of the radio transmission device, whether a first radio apparatus that recognizes only a first communication scheme is within a transmission range of the radio transmission device;
determining, by the circuitry, whether a second radio apparatus that recognizes only the first communication scheme and a second communication scheme is within the transmission range of the radio transmission device;
generating a packet that includes a header portion and a data portion, the header portion including:
first decoding information corresponding to the first communication scheme when the first radio apparatus is within the transmission range,
second decoding information corresponding to the second apparatus when the second radio communication device is within the transmission range, and
third decoding information corresponding to a third communication scheme that is recognizable by a third radio apparatus that also recognizes the first communication scheme and the second communication scheme; and
transmitting the packet.

12. A radio communication method comprising:
receiving, by circuitry, a packet including a header portion and a data portion, the header portion including:
first decoding information corresponding to a first communication scheme when a first radio apparatus that recognizes only the first communication scheme is within a transmission range of a radio transmission device that transmits the packet,
second decoding information corresponding to a second communication scheme when a second radio apparatus that recognizes only the first communication scheme and the second communication scheme is within the transmission range of the radio transmission device, and
third decoding corresponding to a third communication scheme that is recognizable by a third radio apparatus that also recognizes the first communication scheme and the second communication scheme; and
analyzing, by the circuitry, the packet.

13. A radio communication system comprising:
a radio transmission device including packet generation circuitry that generates a packet and a transmitter that transmits the packet, the packet including a header portion and a data portion, the header portion including:
first decoding information corresponding to a first communication scheme when a first radio communication device that recognizes only the first communication scheme is within a transmission range of the radio transmission device,
second decoding information corresponding to a second communication scheme when a second radio communication device that recognizes only the first communication scheme and the second communication scheme is within the transmission range of the radio transmission device, and
third decoding information corresponding to a third communication scheme that is recognizable by a third radio communication device that also recognizes the first communication scheme and the second communication scheme; and
a radio reception device including reception circuitry that receives the packet, and packet analysis circuitry that analyzes the packet, wherein
the packet generation circuitry, to generate the packet, determines whether the first radio communication device is within the transmission range of the radio transmission device and whether the second radio communication device is within the transmission range of the radio transmission device.

14. The radio communication system according to claim 13, wherein, within the header portion, the second decoding information follows the first decoding information, and the third decoding information follows the second decoding information.

\* \* \* \* \*